(12) United States Patent
Labinov et al.

(10) Patent No.: US 6,629,412 B1
(45) Date of Patent: Oct. 7, 2003

(54) ELECTRICITY-PRODUCING HEATING APPARATUS UTILIZING A TURBINE GENERATOR IN A SEMI-CLOSED BRAYTON CYCLE

(75) Inventors: Solomon D. Labinov, Knoxville, TN (US); Jeffrey E. Christian, Lenoir City, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/147,748

(22) Filed: May 16, 2002

(51) Int. Cl.[7] .............. F01K 7/34; F01K 25/02; F02C 1/04
(52) U.S. Cl. .............. 60/653; 60/682; 60/683
(58) Field of Search .............. 60/653, 682, 683

(56) References Cited

U.S. PATENT DOCUMENTS

| | | |
|---|---|---|
| 4,492,085 A * | 1/1985 | Stahl et al. .............. 60/683 |
| 5,558,047 A | 9/1996 | Vetterick |
| 5,903,060 A | 5/1999 | Norton |
| 5,918,463 A | 7/1999 | Penswick et al. |
| 6,313,544 B1 | 11/2001 | Mongia et al. |
| 6,497,090 B2 * | 12/2002 | Bronicki et al. .............. 60/682 |
| 2001/0031440 A1 | 10/2001 | Fullemann et al. |

* cited by examiner

Primary Examiner—Sheldon J. Richter
(74) Attorney, Agent, or Firm—Kirk A. Wilson (57) ABSTRACT

The present invention provides apparatus and methods for producing both heat and electrical energy by burning fuels in a stove or boiler using a novel arrangement of a surface heat exchanger and microturbine-powered generator and novel surface heat exchanger. The equipment is particularly suited for use in rural and relatively undeveloped areas, especially in cold regions and highlands.

20 Claims, 5 Drawing Sheets

Fig. 4

ELECTRICITY-PRODUCING HEATING APPARATUS UTILIZING A TURBINE GENERATOR IN A SEMI-CLOSED BRAYTON CYCLE

The United States Government has rights in this invention pursuant to contract no. DE-AC05-000R22725 between the United States Department of Energy and UT-Battelle, LLC.

FIELD OF THE INVENTION

The present invention relates to apparatus and methods for producing both heat and electrical power by burning fuels, and more particularly to apparatus and methods for producing both heat and electrical power from a fuel-burning stove, boiler, or furnace.

BACKGROUND OF THE INVENTION

A need has long existed for a practical, clean, easy-to-operate, reliable, and inexpensive method to provide heat and electricity for residential housing in rural locations and in developing nations. A wood-burning or coal-burning stove or furnace is one of the most widely used heating devices in rural areas of the USA as well as in many other relatively undeveloped areas, especially in cold regions and highlands. Such a furnace or stove has the advantages of simple design and low cost. Also, it may use local biofuel and does not significantly increase the natural level of carbon dioxide released to the atmosphere. Hot-water and steam boilers have become increasingly popular for family homes in recent years. They provide for radiant and convective heating systems, laundry, bathing, and cooking, as well as provide for air-conditioning and refrigeration by driving absorption coolers. They can also be adapted for use with garages, pools, greenhouses, and the like.

In small, single-family devices, it is customary to circulate hot water using electrically-powered pumps, the power required for one pump often being between 200 and 1000 watts, depending on the model and the length of piping required. When such a heating device is operated continuously, especially under cold or winter conditions, the cost of power consumed by the pump can approach the cost of fuel. Additionally, outages of electrical service caused by natural forces or other factors may put such a furnace out of action and create a grave situation for the user. Battery power or backup emergency gasoline power generation is an expensive alternative.

Thus, attempts have been made to develop devices that utilize waste heat, normally exhausted in flue gases, to produce electricity. Such a source of electricity could be used to pump water in a hot water system, supply power to a local utility grid, or perform other useful work. It could also provide electrical energy to be stored, for example in electrical storage batteries, for future use.

A number of attempts to develop devices that utilize the heat of normally-rejected stack gases to produce electricity have been made over many years. Two basic approaches were under investigation: the first approach employing closed cycle devices such as the Stirling engine, and the second approach employing open cycle devices, such as gas turbines. Both approaches have largely proved to be unsuccessful. In the first case, a high gas temperature (more than 1500° K.) was needed. Such a temperature cannot practically be reached in the combustion area of a wood or coal furnace. In the second case, a high pressure was needed inside a furnace, and also the fuel combustion products quickly clogged the turbine(s).

Because of the above described problems, an effective device that can provide an electrical power supply by utilizing heat released in the furnace of a heating stove, water heater, or boiler has not yet been created. The present invention combines elements into a new configuration that unites a heater or water boiler with a microturbine in such a way that the microturbine working fluid (normally air) is heated by the heat of stack gases with the help of a novel surface heat exchanger located inside the boiler or furnace.

OBJECTS OF THE INVENTION

Accordingly, objects of the present invention include apparatus and methods for producing both heat and electrical energy by combusting fuels with an oxygen-containing material (normally air) in a stove or boiler using a novel arrangement of a surface heat exchanger and microturbine-powered generator. The equipment is particularly suited for use in rural and relatively undeveloped areas, especially in cold regions and highlands. Although air is commonly used in this combustion process, other oxygen-containing materials such as other oxygen-containing gas mixtures may be used in special applications where such oxygen-containing mixtures are available, including undersea laboratories and space stations. Further and other objects of the present invention will become apparent from the description contained herein.

SUMMARY OF THE INVENTION

In accordance with one aspect of the present invention, the foregoing and other objects are achieved by a fuel-burning, electricity-producing apparatus for providing both heat and electrical power by combusting a fuel and an oxygen-containing material which comprises: an essentially closed enclosure further comprising enclosure walls, and suitably configured for combusting a fuel and an oxygen-containing material to produce a flue gas, the enclosure further comprising means for admitting fuel; a first oxygen-containing material duct means for admitting cool oxygen-containing material further comprising a conduit configured and disposed to admit oxygen-containing material at one end and deliver oxygen-containing material to a turbine-generator means at the other end; turbine-generator means further comprising a gas turbine means, a generator means further comprising means to electrically connect said generator means to an electrical load, and a gas compressor means, said turbine means, said generator means, and said gas compressor means being mechanically linked together to operate concurrently, and being configured and disposed to accept cool oxygen-containing material from said first oxygen-containing material duct means, pass the cool oxygen-containing material through said gas compressor, and discharge the cool, compressed oxygen-containing material from said gas compressor; heat exchanger means further comprising a first conduit and a second conduit suitably arranged for heat transfer therebetween, said first conduit for the oxygen-containing material stream configured and disposed to accept cool oxygen-containing material from the compressor discharge of said turbine generator means, pass the oxygen-containing material therethrough to heat the oxygen-containing material, and a second conduit having a surface exposed to flue gas, to accept flue gas from the combustion of the fuel and oxygen-containing material, pass the flue gas therethrough, thus transferring heat from the flue gas stream to the oxygen-containing material stream to produce heated oxygen-containing material; a second oxygen-containing material duct means for conducting heated oxygen-containing material further comprising a conduit configured and disposed to accept heated oxygen-containing material from said heat exchanger and pass the heated oxygen-containing material therethrough and into said enclosure for combustion with the fuel material; and flue gas discharge duct means for receiving flue gas from the discharge of said second conduit of said heat transfer means, conducting the flue gas therethrough, and discharging the flue gas from said enclosure; the entire arrangement being configured so that oxygen-containing material is brought from outside said enclosure, into said enclosure for combustion, and the flue gas is brought from inside said enclosure where combustion occurs, and out of said enclosure for discharge from said enclosure.

In accordance with another aspect of the present invention, a method for providing both heat and electrical power by combusting a fuel and an oxygen-containing material comprises the steps of: providing a fuel-burning, electricity-producing apparatus comprising an essentially closed enclosure further comprising enclosure walls, and suitably configured for combusting a fuel and an oxygen-containing material to produce a flue gas, the enclosure further comprising means for admitting fuel; a first oxygen-containing material duct means for admitting cool oxygen-containing material further comprising a conduit configured and disposed to admit oxygen-containing material at one end and deliver oxygen-containing material to a turbine-generator means at the other end; turbine-generator means further comprising a gas turbine means, a generator means further comprising means to electrically connect said generator means to an electrical load, and a gas compressor means, said turbine means, said generator means, and said gas compressor means being mechanically linked together to operate concurrently, and being configured and disposed to accept cool oxygen-containing material from said first oxygen-containing material duct means, pass the cool oxygen-containing material through said gas compressor, and discharge the cool, compressed oxygen-containing material from said gas compressor; heat exchanger means further comprising a first conduit and a second conduit suitably arranged for heat transfer therebetween, said first conduit for the oxygen-containing material stream configured and disposed to accept cool oxygen-containing material from the compressor discharge of said turbine generator means, pass the oxygen-containing material therethrough to heat the oxygen-containing material, and a second conduit having a surface exposed to flue gas, to accept flue gas from the combustion of the fuel and oxygen-containing material, pass the flue gas therethrough, thus transferring heat from the flue gas stream to the oxygen-containing material stream to produce heated oxygen-containing material; a second oxygen-containing material duct means for conducting heated oxygen-containing material further comprising a conduit configured and disposed to accept heated oxygen-containing material from said heat exchanger and pass the heated oxygen-containing material therethrough and into said enclosure for combustion with the fuel material; and flue gas discharge duct means for receiving flue gas from the discharge of said second conduit of said heat transfer means, conducting the flue gas therethrough, and discharging the flue gas from said enclosure; the entire arrangement being configured so that oxygen-containing material is brought from outside said enclosure, into said enclosure for combustion, and the flue gas is brought from inside said enclosure where combustion occurrs, and out of said enclosure for discharge from said enclosure; admitting fuel into said combustion area; admitting oxygen-containing material into and through said first oxygen-containing duct means, through said compressor means for compression, through said first conduit of said heat exchanger for heating, through said turbine means, and through said second oxygen-containing duct means to said combustion area, the heated oxygen-containing material providing energy input into said turbine means to rotate said compressor means and said generator means; combusting the fuel with the oxygen-containing material within said combustion area to produce flue gas and heat energy; conducting the flue gas through said second conduit of said heat exchanger to heat cool oxygen-containing material to provide heated oxygen-containing material and further conducting the flue gas from said heat exchanger through said flue gas discharge means and from said enclosure; and operating said generator means to produce electrical energy.

BRIEF DESCRIPTION OF THE DRAWINGS

In FIG. 3, a variety of ideal thermodynamic conditions are compared. 1-2-3-4 indicates an adiabatic Brayton cycle. 1-2T-3-4T indicates an isothermic Brayton cycle. 1-2R-3-4R indicates a polytropic Brayton cycle, and 1-2P-3-4P indicates a real Brayton cycle.

In FIG. 4, 1 represents ambient entering air. 1-2 represents cooled compression at the compressor. 2-3 represents heated air at the heat exchanger. 3-4 represents heated expansion at the turbine. 4-5 represents heated gas at the combustion area. 5-6 represents cooled gas at the heat exchanger. 6-7 represents cooled gas at the boiler. 7 represents rejected flue gas.

FIG. 5 shows a section of the wall of the heat exchanger 41. On the surface exposed to flue gas, acoustical resonators 42 in the form of cavities of slots cause vortices of acoustical frequency.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
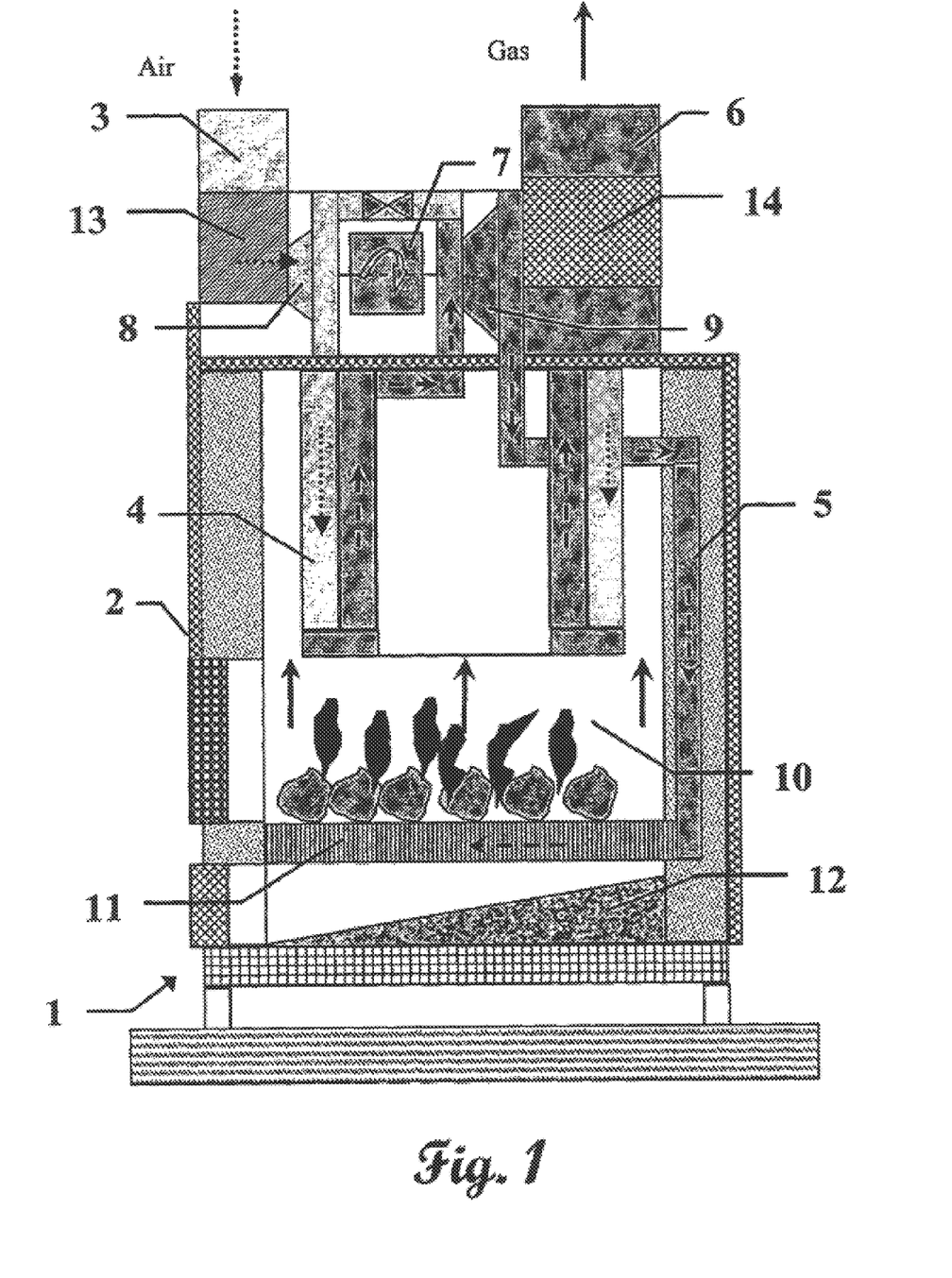
FIG. 1 shows one embodiment of the present invention, arranged for burning solid fuels, such as wood or coal, to heat a building or area, as well as produce electrical power, and wherein the fuel is fed into the enclosure and the ash is removed manually.

In the embodiment of the subject invention shown in FIG. 1, a fuel-burning, electricity-producing heating apparatus 1 comprises an enclosure 2 which forms the body of the apparatus, a first air duct 3 for admitting combustion air into the apparatus and transporting combustion air to a heat exchanger 4, a second air duct 5 for accepting heated combustion air from the heat exchanger 4, a discharge duct 6 for discharging flue gas from the heat exchanger 4 to the outside of the enclosure 2, and a turbine-generator arrangement comprising a generator 7 mechanically coupled to a gas compressor 8 and gas turbine 9. The gas turbine arrangement is configured and connected so that cool incoming combustion air passes through the compressor 8 before being discharged into the heat exchanger 4. Also, the heated incoming combustion air which is discharged from the heat exchanger 4 passes through the turbine 9 and into and through the second air duct 5 to the combustion area 10 for combustion. Flue gas from the combustion of fuel and air then passes through the heat exchanger 4 and is discharged via the discharge duct 6. Heat from the flue gas is exchanged to the incoming combustion air via the heat exchanger 4, thereby providing energy into the combustion air stream which is recovered as electricity in the generator 7. For burning solid fuels, the enclosure would preferably be equipped with an ash grate 11, and a removable ash box 12. Provisions and methods for adding fuel and removing ash may vary from simple openings with doors to more elaborate conveyor systems, all well-known in the art. In addition, filters or other means for providing clean combustion air 13 may be used to prevent buildup of contaminants on the compressor surfaces. Reactors, scrubbers, precipitators, filters, traps, or the like 14 may be utilized in the flue gas stream to clean the flue gas to trap flue gas constituents or reduce air pollution by the flue gas. Methods well known to the skilled artisan may also be used to control air flow in either the incoming combustion air stream, the flue gas stream, or both to modulate or control the combustion process to any desired rate of fuel burn and stochiometry.

Figure 2:
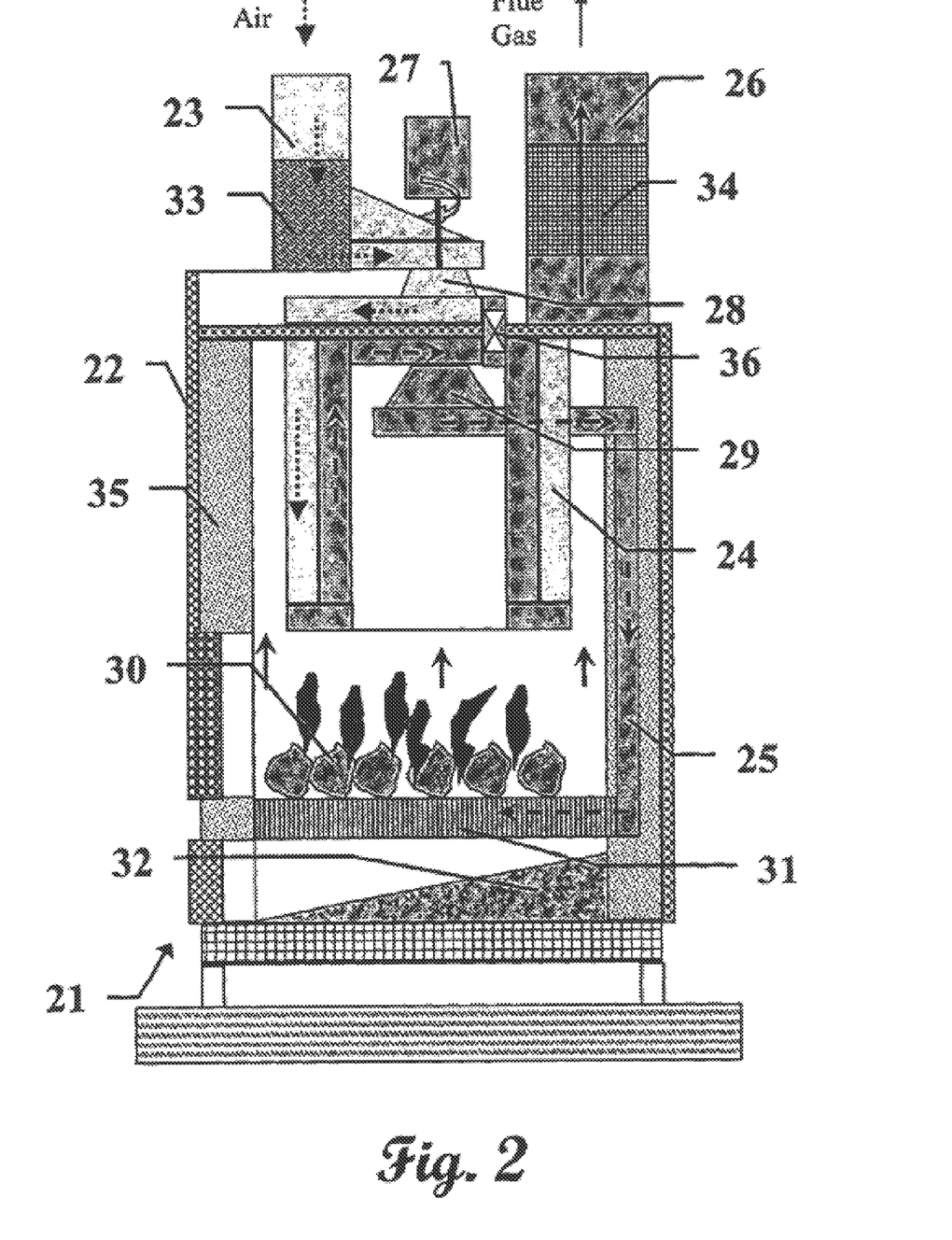
FIG. 2 shows a second embodiment of the present invention, arranged for burning fuels to heat water or other liquid medium, as well as to produce electrical power. The fuel may be fed into the apparatus and ash removed either manually or by mechanical means, many of which are well-known in the art. In this example, also means may be provided to translate either the heat exchanger or the combustion area or both to vary their geometric relationship with each other.
Figure 3:
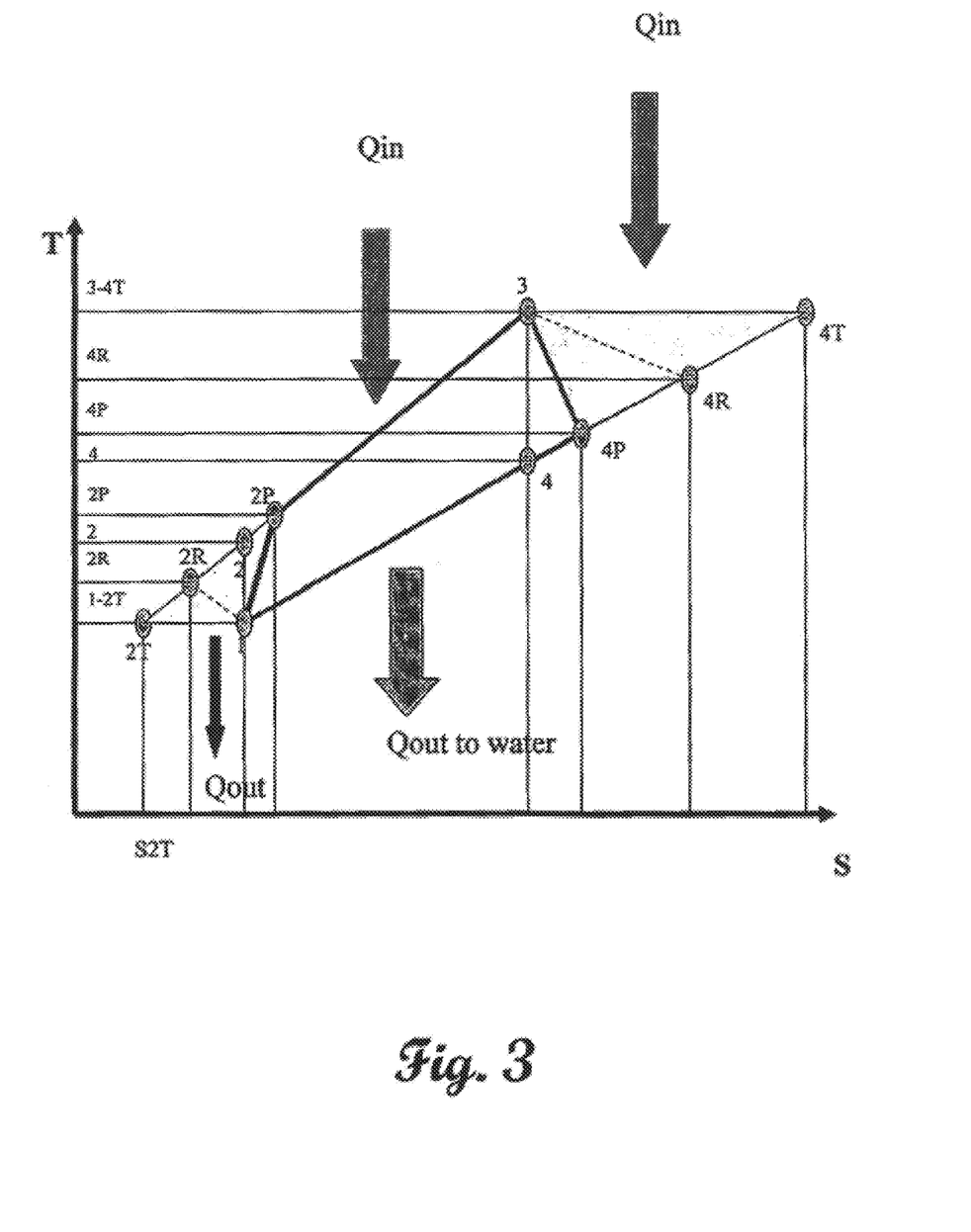
FIG. 3 shows a Temperature-Entropy diagram depicting the Brayton thermodynamic cycle.
Figure 4:
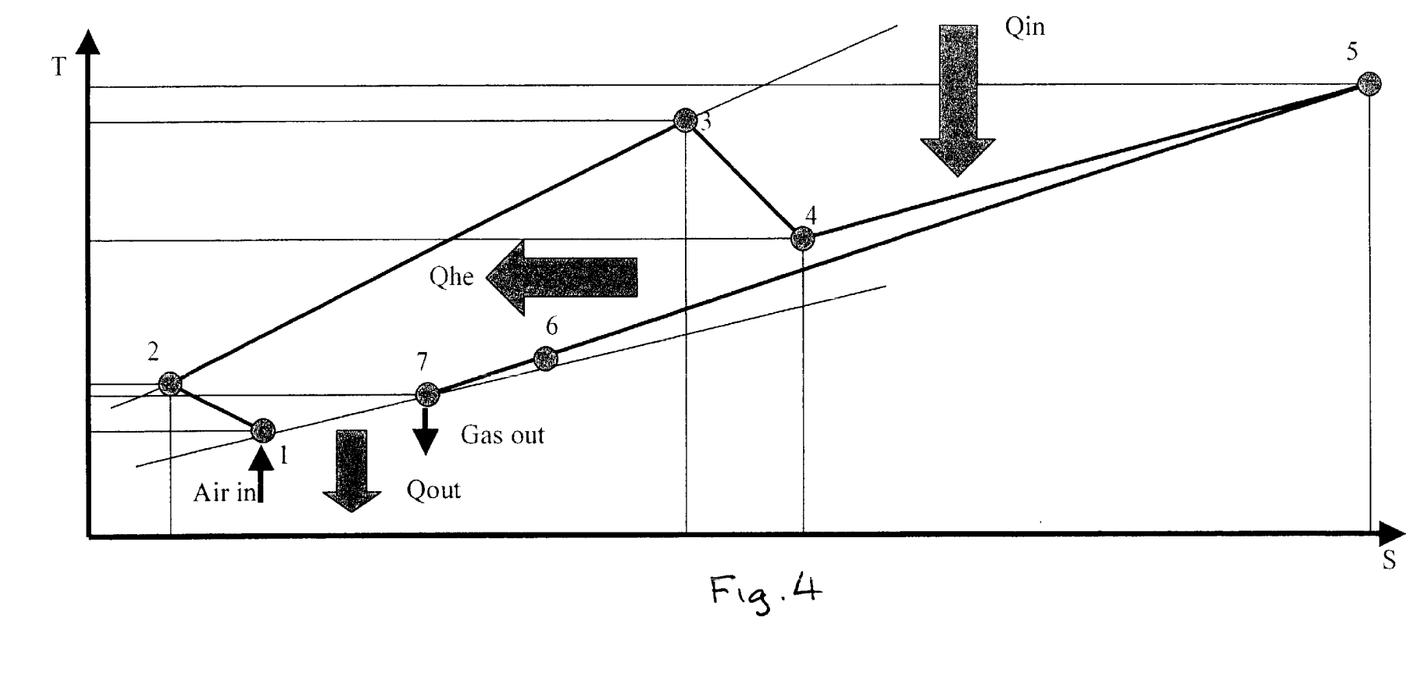
FIG. 4 shows a Temperature-Entropy diagram depicting the Semi-Closed Brayton thermodynamic cycle utilized in the present invention.

An additional important feature, which may be incorporated into some embodiments of the present invention and shown in FIG. 2, is capability to vary the position of either the combustion area 30 or the heat exchanger 24 so that the relative position of the heat exchanger 24 and combustion area 30 can be varied in use. By positioning the combustion area 30 closer to or within the heat exchanger 24, a larger fraction of the energy produced by combustion is transferred through the heat exchanger 24 and turbine 29 to the generator 27 for the production of electricity, and a smaller fraction is transferred to the enclosure 22 wall for heating, such as space and water heating. By positioning the combustion area 30 farther from the heat exchanger 24, a smaller fraction of the energy produced by combustion is transferred through the heat exchanger 24 and turbine 28 to the generator 27 for the production of electricity, and a larger fraction is transferred to the enclosure 22 wall. The enclosure wall may also incorporate means for heating a fluid, such as water or other heat transfer medium, including gases, phase change materials, and slurries of solid and liquid materials. Such a water jacket 35 is shown in FIG. 2. Adjustment of the configuration of the heat exchanger 24 relative to the combustion area 30 may be made manually, by a person who is attending the equipment, or may be made automatically by equipment which may take electrical or mechanical power from an external source or from the apparatus in response to sensing equipment, which detects the need for such adjustment. In this manner, the relative amounts of heat energy and electrical energy produced by the equipment can be varied to optimize fuel usage, satisfy electrical and thermal load demand, and prevent energy waste.

In the embodiment of the subject invention, shown in FIG. 2, a fuel-burning, electricity-producing heating apparatus 21 comprises an enclosure 22 which forms the body of the heating apparatus, a first air duct 23 for admitting combustion air into the apparatus and transporting combustion air to a heat exchanger 24, a second air duct 25 for accepting heated combustion air from the heat exchanger 24, a discharge duct 26 for discharging flue gas from the heat exchanger 24 to the outside of the enclosure 22, and a turbine-generator arrangement comprising a generator 27 mechanically coupled to a gas compressor 28 and gas turbine 29. The gas turbine arrangement is configured and connected so that cool incoming combustion air passes through the compressor 28 before being discharged into the heat exchanger 24. In this embodiment, the compressor 28 is disposed away from the combustion area 30 and outside the enclosure 22 and exposed to cool, ambient air so that heat dissipated from the compressor 28 and compressed air adds to the electric power generating efficiency. Also the heated incoming combustion air which is discharged from the heat exchanger 24 passes through the turbine 29 and into and through the second air duct 25 to the combustion area 30 for combustion. In this embodiment, the turbine 29 is disposed near the combustion area 30 so that additional heat transferred from the combustion process to the turbine 29 adds to the electric power generating efficiency. Flue gas from the combustion of fuel and air then passes through the heat exchanger 24 and is discharged via the discharge duct 26. Heat from the flue gas is exchanged to the incoming combustion air via the heat exchanger 24, thus providing energy into the combustion air stream, which is recovered as electricity in the generator 27. For burning solid fuels, the enclosure 22 would preferably be equipped with an ash grate 31 and an ash removal system 32. Fuel may be fed to the combustion area 30 and ashes may be removed by manual means or by mechanical means, many of which are known to the skilled artisan. Filters or other means for providing clean combustion air 23 may be used to prevent buildup of contaminants on the compressor 28 surfaces. Reactors, scrubbers, precipitators, filters, traps, or the like 34 may be utilized in the flue gas stream to clean the flue gas to trap flue gas constituents or reduce air pollution by the flue gas. The embodiment shown in FIG. 2 also comprises a jacket compartment 35 for heating a medium, such as water. Also, a control valve 36 permits combustion air to bypass the turbine 29 and compressor 28. This provision permits easier startup of the microturbine generator if external power is used for startup and also permits finer control of the stochiometry and electrical output.

Figure 5:
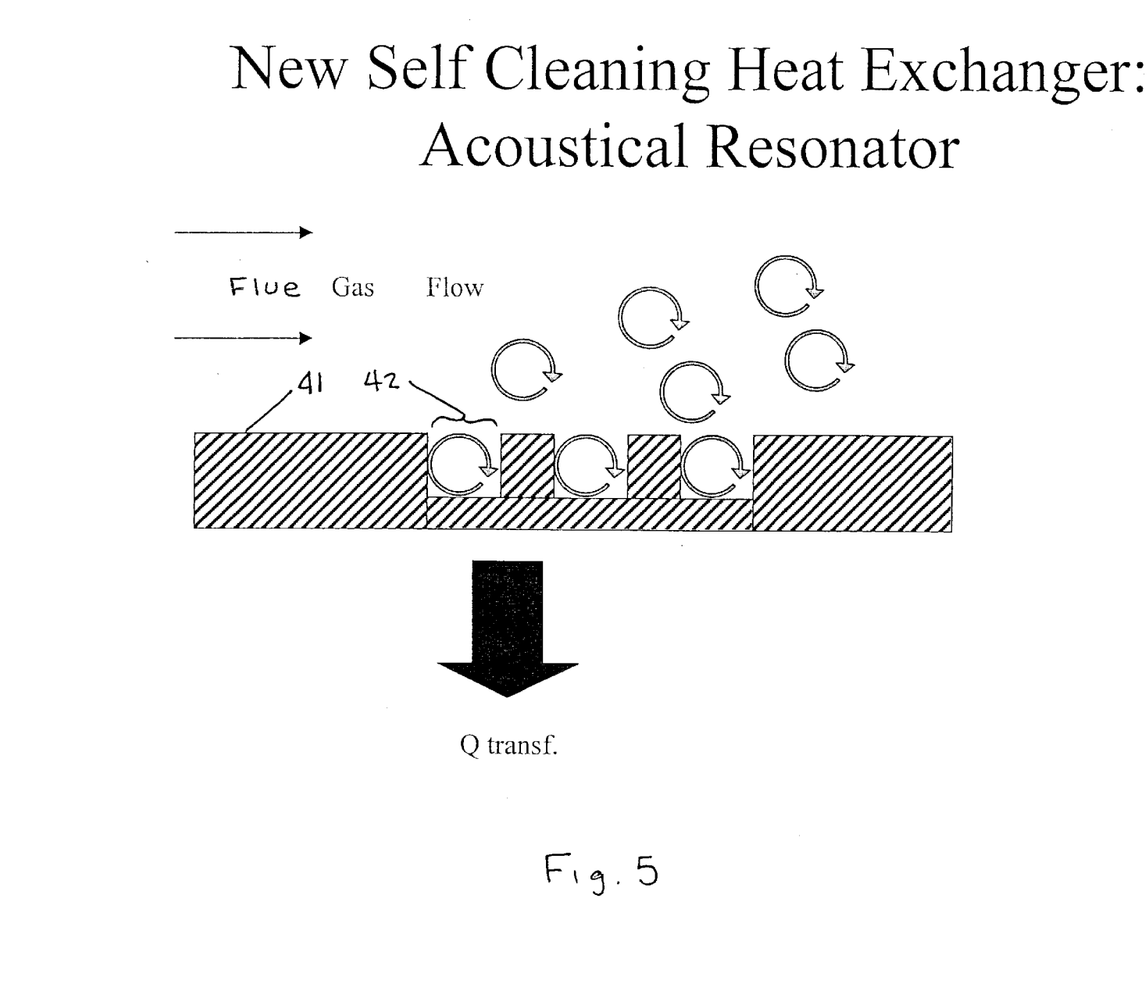

The efficiency of the present invention depends in part upon characteristics of the gas-air heat exchanger 41 shown in FIG. 5. It is essential that the heat exchanger 41 provide for high coefficient of heat transfer from flue gas to combustion air and to prevent its own surface from becoming contaminated by constituents in the flue gas stream. Both problems are solved by a heat exchanger having a surface 41 comprising multiple acoustic resonators. FIG. 5 shows that, in the cavity of each resonator 42, vortices of acoustical frequency are generated, creating turbulence in the flue gas and preventing formation of a laminar boundary layer. As a result, heat and mass transfer between the flue gas stream and the surface 41 of the heat exchanger is intensified, resulting in an increase in heat transfer coefficient as well as producing a strong surface self-cleaning effect. The heat transfer coefficient of a heat exchanger with surface acoustical resonators 42 in known to be 1.5 to 2.0 times greater than that of a heat exchanger with a smooth surface. At the same time, the hydraulic losses are increased insignificantly, by 5 to 10%. By utilizing this novel heat exchanger surface 41, the heat exchanger is not contaminated by products of combustion.

Additional energy may be available for conversion into electrical power due to the differential in pressure between the inlet of the compressor and the outlet of the turbine. This pressure differential, a pressure drop from the inlet of the compressor to the outlet of the turbine, is due to the stack effect, or suction on the discharge duct due to the convective effect of hot flue gas rising in the stack, which is surrounded by cooler, ambient air. This stack effect is greater if the stack is taller and is greater if the flue gas in the stack is hotter. Stack augmentation devices, which utilize wind effects or other methods to increase the stack effect may be utilized and are well known in the art.

Provision for starting the microturbine and generator may comprise a mechanical coupling means such as a shaft, gear, belt or chain drive for connecting the microturbine and generator to an external source of power. The external source of power could comprise a hand-crank apparatus, a motor, or other means for accelerating the compressor; many of which are well known. In another embodiment, the generator may function as a motor during startup and acceleration of the microturbine to bring the microturbine up to a speed sufficient for normal operation. In yet another embodiment, especially where the discharge duct is connected to a chimney or stack of sufficient height to produce sufficient stack draft, natural convection causes a differential pressure between the incoming combustion air at ambient pressure and the discharge flue gas at a pressure less than ambient. the differential is a function of the stack height and temperature differential between ambient temperature and flue gas temperature. This differential pressure may be utilized to accelerate the microturbine to operating speed.

While there has been shown and described what are at present considered the preferred embodiments of the invention, it will be obvious to those skilled in the art that various changes and modifications can be prepared therein without departing from the scope of the inventions defined by the appended claims.

We claim:

1. A fuel-burning, electricity-producing apparatus for providing both heat and electrical power by combusting a fuel and an oxygen containing material comprising:
   A  an essentially closed enclosure further comprising enclosure walls, and suitably configured for combusting a fuel and an oxygen-containing material to produce a flue gas, the enclosure further comprising means for admitting fuel;
   B  a first oxygen-containing material duct means for admitting cool oxygen-containing material further comprising a conduit configured and disposed to admit oxygen-containing material at one end and deliver oxygen-containing material to a turbine-generator means at the other end;
   C  turbine-generator means further comprising a gas turbine means, a generator means further comprising means to electrically connect said generator means to an electrical load, and a gas compressor means, said turbine means, said generator means, and said gas compressor means being mechanically linked together to operate concurrently, and being configured and disposed to accept cool oxygen-containing material from said first oxygen-containing material duct means, pass the cool oxygen-containing material through said gas compressor, and discharge the cool, compressed oxygen-containing material from said gas compressor;
   D  heat exchanger means further comprising a first conduit and a second conduit suitably arranged for heat transfer therebetween, said first conduit for the oxygen-containing material stream configured and disposed to accept cool oxygen-containing material from the compressor discharge of said turbine generator means, pass the oxygen-containing material therethrough to heat the oxygen-containing material, and a second conduit having a surface exposed to flue gas, to accept flue gas from the combustion of the fuel and oxygen-containing material, pass the flue gas therethrough, thus transferring heat from the flue gas stream to the oxygen-containing material stream to produce heated oxygen-containing material;
   E  a second oxygen-containing material duct means for conducting heated oxygen-containing material further comprising a conduit configured and disposed to accept heated oxygen-containing material from said heat exchanger and pass the heated oxygen-containing material therethrough and into said enclosure for combustion with the fuel material; and
   F  flue gas discharge duct means for receiving flue gas from the discharge of said second conduit of said heat transfer means, conducting the flue gas therethrough, and discharging the flue gas from said enclosure;
   the entire arrangement being configured so that oxygen-containing material is brought from outside said enclosure, into said enclosure for combustion, and the flue gas is brought from inside said enclosure where combustion occurs, and out of said enclosure for discharge from said enclosure.

2. The fuel-burning, electricity-producing apparatus as described in claim 1 further comprising means for trapping contaminants from combustion air configured and disposed in series with said first oxygen-containing material duct means for passing the cool oxygen-containing material therethrough.

3. The fuel-burning, electricity-producing apparatus as described in claim 1 further comprising means for trapping flue gas constituents configured and disposed in series with said flue gas discharge duct means for passing the flue gas therethrough.

4. The fuel-burning, electricity-producing apparatus as described in claim 1 wherein said second conduit of said heat exchanger means further comprises acoustical resonators configured and disposed on said surface which is exposed to the flue gas for generating turbulence in the flue gas.

5. The fuel-burning, electricity-producing apparatus as described In claim 1 further comprising means for varying the relative position of said heat exchanger to said combustion area in order to vary the faction of heat output from combustion to said heat exchanger and to said enclosure wall.

6. The fuel-burning, electricity-producing apparatus as described in claim 5 wherein said means for varying the relative position of said heat exchanger to said combustion area may be powered by a human attendant.

7. The fuel-burning, electricity-producing apparatus as described in claim 5 wherein said means for varying the relative position of said heat exchanger to said combustion area may be powered by equipment which utilizes energy taken from the apparatus.

8. The fuel-burning, electricity-producing apparatus as described in claim 7 wherein said means for varying the relative position of said heat exchanger to said combustion area may be powered by equipment which operates in response to sensing equipment which detects the need for such adjustment.

9. The fuel-burning, electricity-producing apparatus as described in claim 5 wherein said means for varying the relative position of said heat exchanger to said combustion area may be powered by equipment which utilizes energy taken from a source remote from the apparatus.

10. The fuel-burning, electricity-producing apparatus as described in claim 9 wherein the means for varying the relative position of said heat exchanger to said combustion area is powered by equipment which operates in response to sensing equipment which detects the need for such adjustment.

11. A method for providing both heat and electrical power by combusting a fuel and an oxygen-containing material comprising the steps of:

provided a fuel-burning electricity-producing apparatus comprising an essentially closed enclosure further comprising enclosure walls, and suitably configured for combusting a fuel and an oxygen-containing material to produce a flue gas, the enclosure further comprising means for admitting fuel; a first oxygen-containing material duct means for admitting cool oxygen-containing material further comprising a conduit configured and disposed to admit oxygen-containing material at one end and deliver oxygen-containing material to a turbine-generator means at the other end; turbine-generator means further comprising a gas turbine means, a generator means further comprising means to electrically connect said generator means to an electrical load, and a gas compressor means, said turbine means, said generator means, and said gas compressor means being mechanically linked together to operate concurrently, and being configured and disposed to accept cool oxygen-containing material from said first oxygen-containing material duct means, pass the cool oxygen-containing material through said gas compressor, and discharge the cool, compressed oxygen-containing material from said gas compressor; heat exchanger means further comprising a first conduit and a second conduit suitably arranged for heat transfer therebetween, said first conduit for the oxygen-containing material stream configured and disposed to accept cool oxygen-containing material from the compressor discharge of said turbine generator means, pass the oxygen-containing material therethrough to heat the oxygen-containing material, and a second conduit having a surface exposed to flue gas, to accept flue gas from the combustion of the fuel and oxygen-containing material, pass the flue gas therethrough, thus transferring heat from the flue gas stream to the oxygen-containing material stream to produce heated oxygen-containing material; a second oxygen-containing material duct means for conducting heated oxygen-containing material further comprising a conduit configured and disposed to accept heated oxygen-containing material from said heat exchanger and pass the heated oxygen-containing material therethrough and into said enclosure for combustion with the fuel material; and flue gas discharge duct means for receiving flue gas from the discharge of said second conduit of said heat transfer means, conducting the flue gas therethrough, and discharging the flue gas from said enclosure; the entire arrangement being configured so that oxygen-containing material is brought from outside said enclosure, into said enclosure for combustion, and the flue gas is brought from inside said enclosure where combustion occurs, and out of said enclosure for discharge from said enclosure.

admitting fuel into said combustion area;

admitting oxygen-containing material into and through said first oxygen-containing duct means, through said compressor means for compression, through said first conduit of said heat exchanger for heating, through said turbine means, and through said second oxygen-containing duct means to said combustion area, the heated oxygen-containing material providing energy input into said turbine means to rotate said compressor means and said generator means;

combusting the fuel with the oxygen-containing material within said combustion area to produce flue gas and heat energy;

conducting the flue gas through said second conduit of said heat exchanger to heat cool oxygen-containing material to provide heated oxygen-containing material and further conducting the flue gas from said heat exchanger through said flue gas discharge means and from said enclosure; and operating said generator means to produce electrical energy.

12. The method for providing both heat and electrical power as described in claim 11 wherein the incoming oxygen-containing material is air, the method further comprising the steps of providing means for trapping contaminants from combustion air configured and disposed in series with said first oxygen-containing material duct means and trapping contaminants from combustion air by passing incoming combustion air therethrough.

13. The method for providing both heat and electrical power as described in claim 11 wherein the method further comprises the steps of providing trapping means for trapping flue gas constituents configured and disposed in series with said flue gas discharge duct means and trapping flue gas constituents from the flue gas by passing flue gas therethrough.

14. The method for providing both heat and electrical power as described in claim 11 wherein said second conduit of said heat exchanger means further comprises acoustical resonators configured and disposed on said surface which is exposed to the flue gas for generating turbulence in the flue gas.

15. The method for providing both heat and electrical power as described in claim 11 wherein the method further comprises the steps of providing means for varying the relative position of said heat exchanger to said combustion area, and operating the means for varying the position of said heat exchanger to said combustion area in order to vary the fraction of heat output from combustion to said heat exchanger and to said enclosure wall.

16. The method for providing both heat and electrical power as described in claim 15 wherein a human attendant provides power to vary the relative position of said heat exchanger to said combustion area.

17. The method for providing both heat and electrical power as described in claim 15 wherein energy taken from the apparatus provides power to vary the relative position of said heat exchanger to said combustion area.

18. The method for providing both heat and electrical power as described in claim 17 wherein the energy taken from the apparatus to provide power to vary the relative position of said heat exchanger to said combustion area operates in response to sensing equipment which detects the need for such adjustment.

19. The method for providing both heat and electrical power as described in claim 15 wherein energy taken from a source remote from the apparatus provides power to vary the relative position of said heat exchanger to said combustion area.

20. The method for providing both heat and electrical power as described in claim 19 wherein energy taken from a source remote from the apparatus to provides power to vary the relative position of said heat exchanger to said combustion area operates in response to sensing equipment which detects the need for such adjustment.

* * * * *